United States Patent [19]

Pierce et al.

[11] Patent Number: 4,518,152

[45] Date of Patent: May 21, 1985

[54] DEVICE FOR LOOSENING A CABLE WITHIN A CONDUIT

[76] Inventors: Harry C. Pierce, 1785 Van Buren St., San Mateo, Calif. 94403; Helen A. B. Bailey, 1984 Evergreen, La Verne, Calif. 91750

[21] Appl. No.: 464,005

[22] Filed: Feb. 4, 1983

[51] Int. Cl.³ .............................................. H02G 1/08
[52] U.S. Cl. .................... 254/134 R; 254/134.3 FT; 15/104.04; 15/104.05; 15/104.16
[58] Field of Search .............. 254/134.3 FT, 134.3 R; 15/104.05, 104.04, 104.14, 104.16, 104.3 SN; 128/304

[56] References Cited

U.S. PATENT DOCUMENTS

| 804,921 | 11/1905 | Blackburn | 15/104.04 |
| 951,202 | 3/1910 | Shirk | 15/104.16 X |
| 1,899,379 | 2/1933 | Adams | 15/104.04 |
| 2,944,552 | 7/1960 | Cannon | 128/304 |

Primary Examiner—Frederick R. Schmidt
Assistant Examiner—Steven P. Schad
Attorney, Agent, or Firm—Harvey S. Hertz

[57] ABSTRACT

A generally cylindrical tubular sleeve member sized for easy clearance within a conduit. The tubular sleeve member has a shaped mouth on at least one end for freeing a cable adhered to the inside of the conduit when the sleeve member is drawn longitudinally through the conduit with the cable passing through the inside sleeve space. In one embodiment, a portion of the sleeve wall is hinged for placement over an in-service cable and in another embodiment an end portion of the sleeve is rotatable through a limited angle as controlled by a radial pin and slot arrangement. A yoke fits into holes within the sleeve wall and provides attachment for a draw line.

2 Claims, 4 Drawing Figures

DEVICE FOR LOOSENING A CABLE WITHIN A CONDUIT

BACKGROUND OF THE INVENTION (1) Field of the Invention

The invention relates to field maintenance of subterranean cables in conduit, particularly for loosening or freeing such cable from adhesion to the conduit inside wall.

(2) Description of the Prior Art

In the prior art various devices intended to be drawn through a pipe for cleaning, smoothing or similar purposes are extant. Two such devices intended for sewer line cleaning are shown in U.S. Pat. Nos. 986,462 and 951,202, in the form of a cage-like article and a sludge bucket, respectively. An articulated, traveling, chain of double conical members forming a pipeline squeegee apparatus is shown in U.S. Pat. No. 3,778,859. The greatest diameter of each double conical section has a circular shape and produces a wiping action against pipeline inside walls.

A sharpened-edge ring-like, surgical instrument with a stem or rod-like handle is intended to be used for removing "intima" from the interior of an artery is shown in U.S. Pat. No. 2,944,552.

In accordance with the foregoing, it will be seen to be known to push or pull an article through a tubular member or vessel to remove deposits of one kind or another, however, the known prior art does not address the particular problem of freeing or loosening a cable or the like from adherence to the interior wall of a conduit through which it has been deployed.

The manner in which the invention provides a novel device for the aforementioned cable loosening use will be evident as this description proceeds.

SUMMARY OF THE INVENTION

The invention is particularly useful for freeing a subterranean telephone cable adhering to the interior wall of a conduit in which it had been deployed at an earlier time. Metallic sheathed cables (lead for example) have conductive outer surfaces which can become adhered to the conduit over a period of time as a result of electrolysis. Cables sheathed with insulating materials (plastics, for example) can become similarly adhered to a conduit wall in a subterranean installation if water borne minerals or other extraneous materials settle around the cable.

It may be said to have been the general object of the invention to provide a simple but effective device for freeing a cable adhered to a conduit wall.

A detailed description of the device of the invention and alternative embodiments thereof follows.

DETAILED DESCRIPTION

Figure 1:
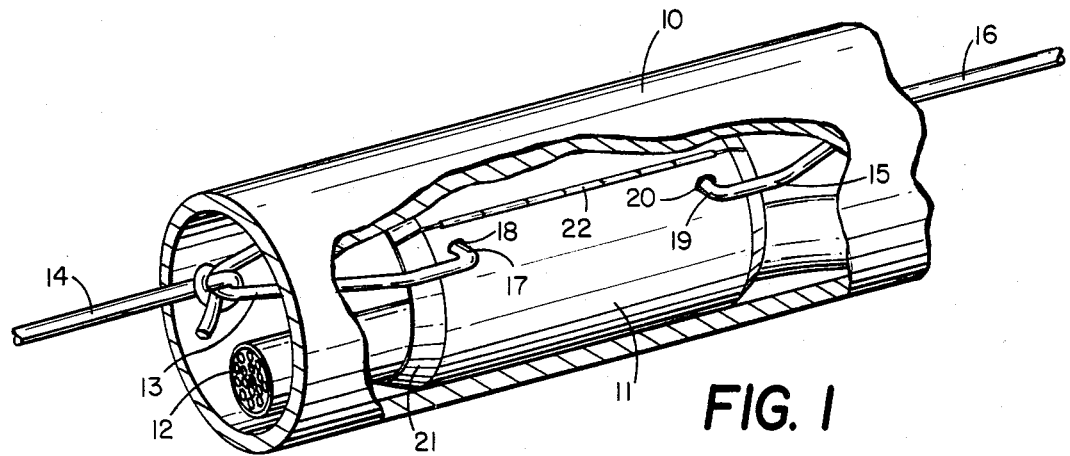
FIG. 1 is a partially cut-away pictorial showing the device of the invention as it would be normally operative.

Referring now to FIG. 1, a first embodiment of the invention is depicted as it would be in use within a partially cut-away conduit 10. A sleeve member 11 is fitted with yokes 13 and 15 facilitating the traversing of the sleeve 11 within conduit 10 to the left or right (as represented in FIG. 1) in response to an applied pulling force on lines 14 or 16, respectively. The yokes or bails 13 and 15 are inserted into the sleeve 11 and remain by their own resilience as they are fitted at 17 and 19 into typical holes 18 and 20, respectively, in the sleeve 11. Holes 18 and 20 may be either bottomed in the wall of the sleeve 11 or may be drilled through the entire wall thickness of sleeve 11.

A typical cable 12, which may be in service and therefore not cut as suggested in FIG. 1 may be encountered in a manhole or junction box and fitted into the sleeve by opening an access panel (i.e., the portion of the sleeve wall 23) hinged at 22 (see FIG. 4), before the sleeve 11 is pulled into the conduit 10. Of course, if the cable is not in service and is merely to be removed, then the access panel 23 is not necessary. A tight fit of the panel 23 can be assured by relying on circumferential resilience if it is a sufficiently tight fit. Of course, other fastener means can be provided if desired, provided no significant obstruction along the sleeve inside or outside surface is thereby caused.

Figure 4:
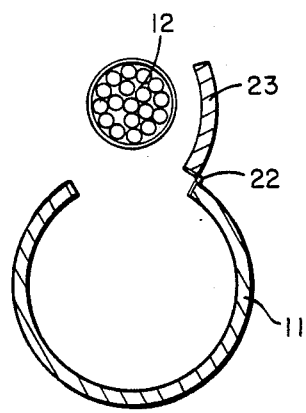
FIG. 4 illustrates the embodiment of the invention according to FIG. 1 for use with an in-service cable.

Another specific access panel variation in lieu of the FIGS. 1 and 4 showing is possible as a tightly fit axially slideable panel of the same size and shape as 23. A tongue and groove arrangement can provide radial stability in that arrangement, the tongues and grooves being in mating form in the sliding panels and interfacing surface of the larger sleeve portion.

In FIG. 1, a chamfered nose 21 is shown to provide freedom from "dig-in" where deposits may lie in the conduit. The knife edge of the nose 21 should not be so sharp as to dig into the cable sheath.

Figure 2:
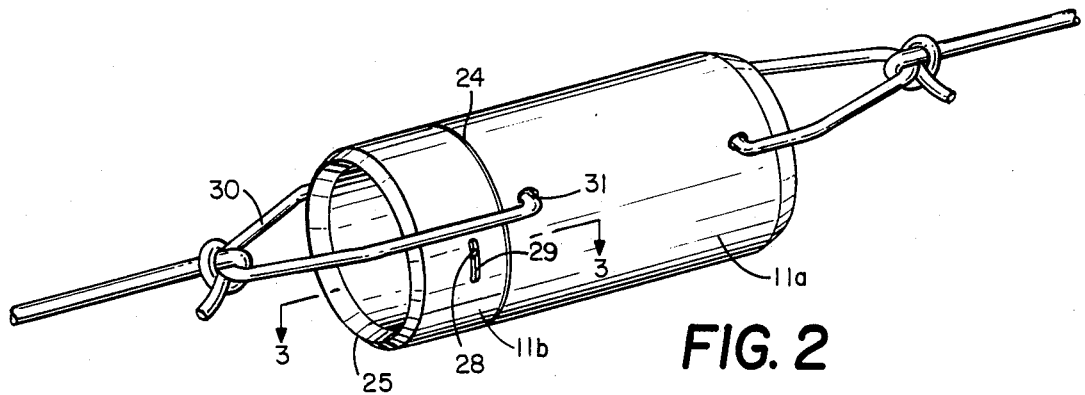
FIG. 2 is a pictorial of the device of the invention in a form including an end portion which is freely rotatable within a limited angle.
Figure 3:
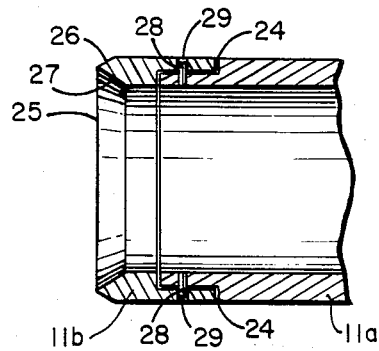
FIG. 3 shows a sectional detail of the embodiment of FIG. 2.

Referring now to FIG. 2, a closed perimeter embodiment of the sleeve is depicted at 11a. A nose portion 11b is included and is rotatable over a limited angle in response to forces generated as the entire sleeve assembly is drawn through the conduit. The attachment of the nose 11b forms a rotational interface at 24, the typical yoke 30 being joined to 11a as shown at 31 in the same manner as described for yokes 13 and 15 of FIG. 1. Thus the rotational freedom referred to is constrained only by the slot 29 and pin 28 within it. FIG. 3 is a partial sectional taken as indicated on FIG. 2 and clarifies the details of the rotational freedom of 11b. Also, in FIG. 3 the nose end 25 is further clarified in that a small amount of exterior chamfer 26 is provided and a larger amount of chamfer 27 lifts the cable away from the conduit wall to which it may be adhered as the assembly is drawn through the conduit.

Of course, the cutting edge 25 of the nose portion 11b may be duplicated at the other end of 11a if desired, as is the case with chamfer 21 of of sleeve 11 as depicted in FIG. 1.

The angles of chamfer at 26 and 27 are not critical, the former (26) avoiding the "dig-in" effect referred to in connection with FIG. 1 and the latter (27) providing a degree of prying action against the cable sheath as aforementioned.

Although the configuration of FIG. 2 is not applicable to the in-use cable situation as shown, it can be made so by separate inclusion of the access "door" or tongue and groove slide panel described hereinbefore in the sleeve body 11a and nose 11b.

It has been found that the limited rotational freedom of nose 11b provides improved performance overall in that tendencies of the sleeve body 11a to rotate due to variations in the resolved force components it experiences are not automatically reflected in forces other than the desired axial force effective at nose 11b.

The lengths of 11, 11a or 11b are matters of design freedom, although an overall assembly lengths of at least two conduit inside diameters is desirable so that side-to-side movements do not result in binding of the sleeve assembly within the conduit.

The sleeve outside diameter must obviously be smaller than the conduit inside diameter by an amount such that the yokes 13, 15, and 30 also comfortably clear the conduit inside surface.

Suitable materials for the parts of the device will be obvious to those of skill in this art. Common metals are suitable, the yokes and pins preferably being of high strength metal.

The device is not limited to use in conduits of circular cross-section.

Modifications and variations within the spirit of the invention will suggest themselves to those of skill in the art, and accordingly it is not intended that the drawing and this description should be regarded as limiting the inventive concept. The drawing and this description are to be considered as typical and illustrative only.

We claim:

1. A device for freeing a cable adhering to the inside walls of a conduit, comprising:

a tubular sleeve having an outside diameter less the smallest cross-sectional dimension of said conduit, said sleeve having an inside diameter greater than the outside diameter of a cable to be freed from adherence to an inside wall of said conduit;

means for attaching a draw line to said sleeve for drawing said device through said conduit with said cable feeding through said sleeve inside diameter;

a nose portion at least at one end of said sleeve, said nose portion comprising internal and external circumferential chamfers at the same end of said nose portion, said internal chamfer exerting a prying action against said cable as said device is drawn through said conduit, said external chamfer together with said internal chamfer acting to provide a knife edge, said nose portion being rotatably associated with an end of said sleeve but with capture means such that the longitudinal center lines of said nose portion and the remainder of the length of said sleeve remain substantially coincident without longitudinal separation therebetween, said capture means also limiting the relative rotation of said nose portion and said sleeve remainder.

2. A device according to claim 1 in which said means for limiting said relative rotation of said sleeve and nose portion includes at least one pin in the wall of one of said sleeve and nose parts and a corresponding circumferentially extending slot in the other of said parts, said pin projecting radially into said slot, the walls of said sleeve and nose overlapping longitudinally in the vicinity of said pin and slot.

* * * * *